United States Patent [19]

Pasternak

[11] Patent Number: 5,661,610
[45] Date of Patent: Aug. 26, 1997

[54] TELESCOPE FOR INFRARED OR VISIBLE IMAGING

[75] Inventor: Frederick Pasternak, Gaure, France

[73] Assignee: Matra Marconi Space France S.A., Paris, France

[21] Appl. No.: 454,319

[22] PCT Filed: Oct. 17, 1994

[86] PCT No.: PCT/FR94/01198

§ 371 Date: Jul. 27, 1995

§ 102(e) Date: Jul. 27, 1995

[87] PCT Pub. No.: WO95/10793

PCT Pub. Date: Apr. 20, 1995

[30] Foreign Application Priority Data

Oct. 15, 1993 [FR] France ................................ 93 12302

[51] Int. Cl.$^6$ .............................. G02B 5/10; G02B 17/00
[52] U.S. Cl. ......................... 359/859; 359/364; 359/366; 359/731
[58] Field of Search ................................. 359/364–366, 359/350, 351, 725–731, 850–861, 399, 422, 434

[56] References Cited

U.S. PATENT DOCUMENTS

| | | | |
|---|---|---|---|
| 3,927,254 | 12/1975 | Lessman | 359/356 |
| 4,017,163 | 4/1977 | Glass | 359/365 |
| 4,101,195 | 7/1978 | Frosch | 359/366 |
| 4,240,707 | 12/1980 | Wetherell et al. | 359/859 |
| 4,598,981 | 7/1986 | Hallam et al. | 359/366 |
| 5,144,496 | 9/1992 | Kashima | 359/859 |
| 5,386,316 | 1/1995 | Cook | 359/365 |

FOREIGN PATENT DOCUMENTS 0 267 766  5/1988  European Pat. Off. .
2 244 145  11/1991  United Kingdom .

OTHER PUBLICATIONS

"Seviri, the new imager for Meteosat generation", F. Pasternak et al., Proceedings of 1993 IGARSS Symposium, vol. III.

Applied Optics, vol. 17, n° 17, Sep. 1978, P.N. Robb "Three mirror telescopes design and optimization", pp. 2677–2685.

*Primary Examiner*—Thong Nguyen
*Attorney, Agent, or Firm*—Larson and Taylor

[57] ABSTRACT

The telescope includes at least one primary concave mirror (M1) for receiving an incoming image and relay optics for enlarging the image reflected by the primary mirror. The relay optics comprise a secondary mirror (M2) and a tertiary mirror (M3), each having a central aperture (12, 13) and each being positioned coaxially with the primary mirror (M1). The secondary mirror (M2) receives the image reflected by the primary mirror (M1) through the central aperture (13) of the tertiary mirror (M3). The tertiary mirror (M3), positioned close to the focal plane of the primary mirror (M1), receives the image reflected by the secondary mirror (M2) and reflects that image through the central aperture of the secondary mirror (M2).

16 Claims, 3 Drawing Sheets

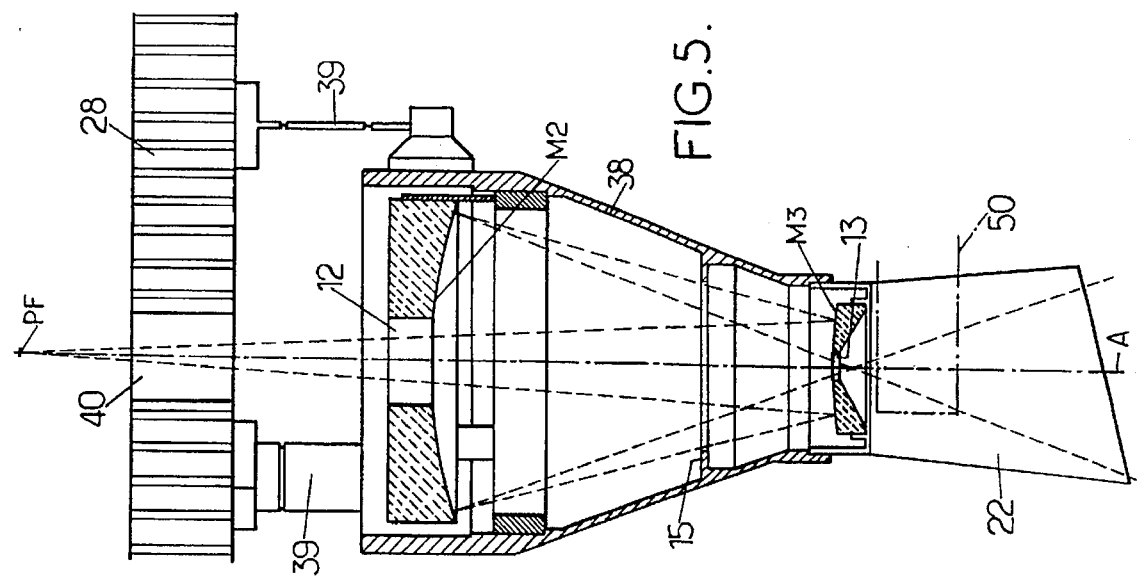
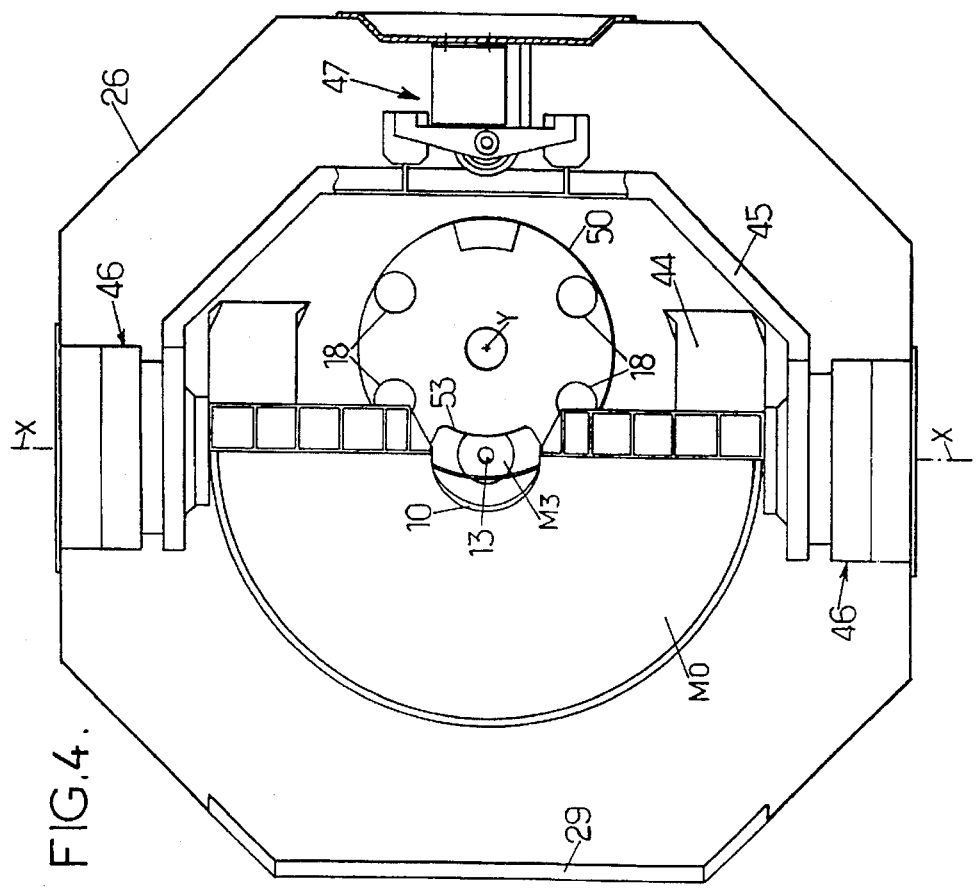

TELESCOPE FOR INFRARED OR VISIBLE IMAGING

FIELD OF THE INVENTION

The present invention relates to a telescope, and in particular to a telescope which is capable of forming part of an image-recording instrument located on board a satellite to carry out the observation of the Earth in infrared and/or visible wavelength ranges, for the purposes of studies or of weather forecasts.

BACKGROUND OF THE INVENTION

Such an instrument is described in the article "SEVIRI, the new imager for Meteosat second generation", by F. Pasternak et al, which appeared in "Proceedings of 1993 IGARSS Symposium, Volume III". This instrument includes an optical detection assembly situated at the location of the focal plane of the telescope, taking images of the Earth in various infrared or visible wavelength channels. This optical assembly is associated with a cooling system intended to keep the detectors at a temperature which is as low as possible; this reduces the detected noise. The telescope is a Ritchey-Chretien telescope including a primary concave mirror receiving an incoming image which is reflected back by a plane scanning mirror, and a convex secondary mirror disposed coaxially with the primary mirror and reflecting back the image reflected by the latter towards the focal plane of the telescope through a central aperture formed in the primary mirror. A disadvantage of this telescope is the relatively great height between the base of the scanning unit and the focal plane of the telescope (at least 1500 mm). This bulkiness reduces the space available for the system for cooling the detectors, and thus limits the possibilities for cooling.

Other types of telescope have likewise been proposed, in particular Gregory telescopes. However, their bulkiness likewise causes difficulties, and they frequently require relatively complex screen structures to reduce the interferences caused by the extraneous light.

As described in the aforementioned publication, the telescope is, in general, associated with a calibration source for the infrared channels. In the calibration phase, this source covers the whole of the entrance aperture of the telescope, and must therefore be of relatively large dimensions; this presents problems of bulkiness and of temperature regulation.

SUMMARY OF THE INVENTION

The object of the present invention is to propose a novel design of telescope permitting the reduction of at least some of the difficulties set forth hereinabove.

Accordingly, the invention proposes a telescope comprising at least one primary concave mirror disposed to receive the image reflected by a plane mirror and to collect the luminous flux and relay optics for enlarging the intermediate image formed by the primary mirror, The relay optics include a secondary mirror and a tertiary mirror, each having a central aperture, and which mirrors are disposed coaxially with the primary mirror. The secondary mirror receives the image reflected by the primary mirror through the central aperture of the tertiary mirror. The tertiary mirror, which is disposed in the vicinity of the focal plane of the primary mirror, receives the image reflected by the secondary mirror and reflects this image through the central aperture of the secondary mirror. The plane mirror, exhibiting a central aperture intended for the passage of the relay optics, is placed ahead of the primary mirror in the vicinity of the focal point of the latter, and can be utilized for scanning the scene observed.

The overall focal length of the telescope is the result of the successive enlargements by the secondary and tertiary mirrors. For one and the same overall focal length, it is then possible to reduce the overall dimensions of the telescope. Moreover, the splitting of the enlargement between the two mirrors reduces the sensitivity of the telescope to defects of alignment.

A significant advantage of this telescope results from the fact that the central aperture in the tertiary mirror can be of reduced cross-section, by reason of its arrangement in the vicinity of the focal plane of the primary mirror. This small aperture of the tertiary mirror transmits only a little extraneous radiation towards the secondary mirror and the focal plane of the telescope.

In an optimal configuration, the secondary mirror is concave and the tertiary mirror is convex.

The entrance pupil of the telescope can be defined simply by a diaphragm disposed coaxially between the secondary and tertiary mirrors.

When the tertiary mirror is situated—slightly—beyond the focal plane of the primary mirror relative to the position of the latter, it is possible to equip the telescope with a calibration source and with a mechanism permitting this source to be brought into a position substantially corresponding to the focal point of the primary mirror. The calibration source can then be of reduced dimensions while still properly covering the entrance of the relay optics; this provides a considerable improvement to the calibration sources of large dimensions which have been utilized up to the present time. It is moreover possible to provide a plurality of calibration sources corresponding, for example, to a plurality of reference temperatures or to a plurality of wavelengths.

BRIEF DESCRIPTION OF THE DRAWINGS

FIG. 4 is a view, in transverse cross section, of this telescope according to the plane IV—IV indicated in FIG. 3; and FIG. 5 is a view in cross section similar to that of FIG. 3 showing, on a larger scale, the relay optics of the telescope.

DESCRIPTION OF THE PREFERRED EMBODIMENT

Figure 1:
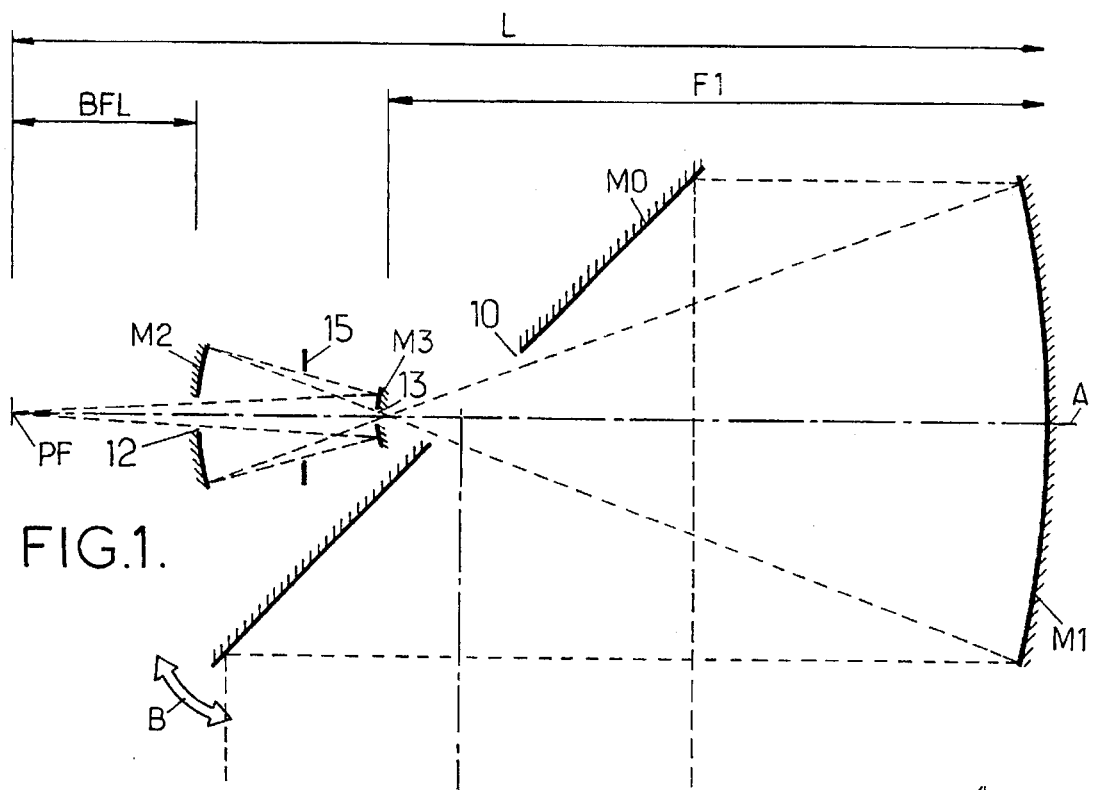
FIG. 1 is a diagram showing the arrangement of the mirrors in a telescope according to the invention.

The telescope which is diagrammatically illustrated in FIG. 1 comprises a primary concave mirror M1 reflecting back the incoming image towards relay optics including a secondary concave mirror M2 and a tertiary convex mirror M3. The mirrors M2 and M3 are disposed coaxially with the mirror M1, perpendicularly to the optical axis A, and are each provided with a central aperture 12, 13. The tertiary mirror M3 is disposed in the vicinity of the focal plane of the primary mirror M1, slightly beyond this focal plane relative to the primary mirror M1. The image reflected by the mirror M1 passes through the central aperture 13 of the tertiary mirror M3 to arrive at the reflecting surface of the secondary mirror M2. The mirror M2 enlarges the image and reflects it towards the reflecting surface of the mirror M3. The latter further enlarges the image and reflects it towards the focal point PF of the telescope through the central aperture 12 of the secondary mirror M2. The optical paths are indicated by dashed lines on the figures.

Behind the focal point PF there are situated an optical detection assembly and a cooling system which are conventional, for example of the type described in the publication cited in the introduction.

The assembly is intended to be mounted on board a geostationary satellite for the observation of the Earth. To form an image of the scene observed, a first scanning direction is provided by the rotation of the satellite with respect to itself, and a second scanning direction is provided by a plane scanning mirror M0 reflecting back the incoming image onto the primary mirror M1. The scanning mirror M0 is likewise situated in the vicinity of the focal plane of the mirror M1, slightly short of this focal plane relative to the position of the mirror M1. The scanning mirror M0 is provided with a central aperture 10 intended to transmit the light from the mirror M1 towards the relay optics. The scanning mirror M0 can be oriented by causing it to pivot with respect to itself as indicated by the arrow B in FIG. 1.

The arrangement of the telescope permits a diaphragm 15 to be disposed in the relay optics, coaxially between the secondary and tertiary mirrors M2, M3, to define the pupil of the telescope.

The three-mirror configuration permits a wide range of dimensions for the telescope. It is in particular possible to obtain a large overall focal length with a relatively short overall length L (between the primary mirror M1 and the focal point PF of the telescope) by an appropriate choice of the focal length F1 of the mirror M1, of the rear focal length BFL (between the mirror M2 and the focal point PF) and of the distance between the mirrors M2 and M3.

The diameter of the central hole 13 of the mirror M3 is typically chosen to be less than 40% of the diameter of the mirror M3, in order to limit the obscuration. This condition determines the maximum distance between the mirror M3 and the focal plane of the mirror M1, which is on the order of the diameter of the hole 13 multiplied by the ratio F1/D1 between the focal length F1 and the diameter D1 of the primary mirror.

The bulkiness parameters and the optical parameters which are presently preferred follow:

diameter of M1: 500 mm, overall focal length: 4 473 mm (scale ratio of 125 μm/km at the location of the focal plane of the telescope), overall length L: 1 100 mm, field of view: +/−10 mm (at the location of the focal plane of the telescope), a selection has for example been made of the following dimensional parameters:

focal length F1 of M1: 700 mm, magnification of M2: 1.37, magnification of M3: 4.67, distance between M2 and M3: 190 mm, rear focal length BFL: 200 mm.

diameter of the mirror M3: 46 mm diameter of the mirror M2: 145 mm diameter of the hole 13: 10 mm diameter of the hole 12: 34 mm The focal point of the primary mirror M1 is situated at 10 mm from the mirror M3 in order to be accessible for calibration as will be explained hereinbelow. The central obscuration due to the holes 12, 13 necessary in the mirrors M2, M3 is kept less than 0.3.

The mirror M3 may be a spherical convex mirror; this is easier to manufacture than an aspherical convex mirror. The mirrors M1 and M2 may be concave elliptical aspherical mirrors, M1 being approximately parabolic and M2 approximately spherical in order to facilitate the manufacture thereof and the checking thereof. The arrangement of the invention does not demand any particular choice for the material of the mirrors. It will in particular be possible to utilize, in a conventional manner, ZERODUR or the CSiC ultra-light composites.

Figure 2:
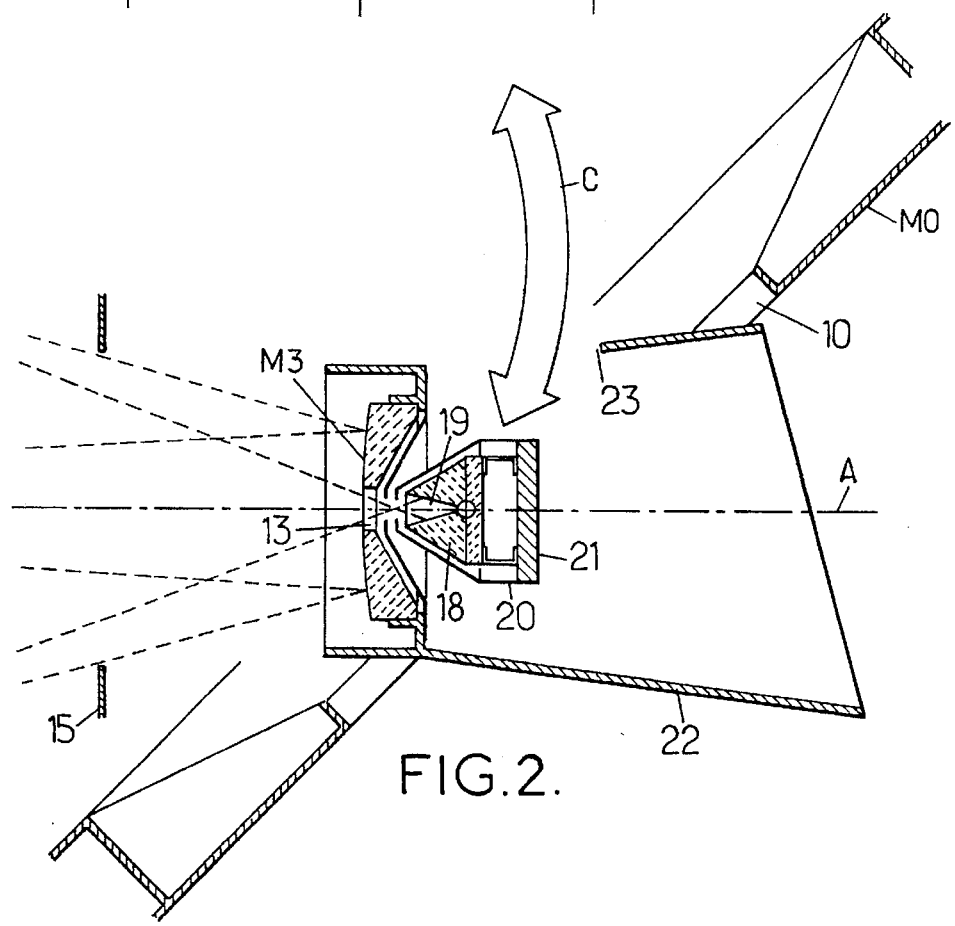
FIG. 2 is a view in axial cross section illustrating the positioning of a calibration light source close to the tertiary mirror.

When the optical detection assembly situated downstream of the telescope requires a calibration procedure, it is possible to utilize a calibration source such as that represented in FIG. 2. A significant advantage of the invention is that this source may be of reduced dimensions when it is placed at the location of the focal point of the primary mirror M1. This focal point is accessible, given that the mirror M3 is situated slightly beyond this focal point relative to the position of the mirror M1.

In the arrangement represented in FIG. 2, the calibration source 18 is an infrared source constituted by a black body having well-defined emission characteristics. The emissivity of the source may be made very close to 1, by virtue of a cavity effect there is then formed in the black body a cavity 19 which is open towards the central aperture 13 of the mirror M3. The support 20 of the source 18 is provided, on its rear face, with a barrier 21 which stops the radiation originating from the mirror M1 during the calibration procedure. The telescope includes a mechanism, not shown in FIG. 2, permitting the source 18 to be brought to the position corresponding to the focal point of the mirror M1. FIG. 2 shows that a screen of frustoconical shape 22 is provided to the rear of the mirror M3, with its broad base open towards the mirror M1. In order to proceed with the calibration, the source 18 can be brought to the focal point of the mirror M1 through an aperture 23 provided in the screen 22, as is indicated by the arrow C in FIG. 2.

As the pupil of the telescope is defined between the mirror M2 and the focal plane of the mirror M1, the calibration by means of the source 18 can be carried out over the entire aperture of the telescope, and the optical beams utilized are the same as in the course of normal image recording; this is significant as regards the precision of the calibration. The calibration does not take into account the contribution of the scanning mirror M0 and of the primary mirror M1, but this contribution can readily be evaluated by calculation, and taken into account in the form of a correction term in the calibration procedure.

The telescope may include a plurality of infrared and/or visible calibration sources, depending upon the requirements, a bringing mechanism being arranged to bring one of them to the location of the focal point of the primary mirror.

Figure 3:
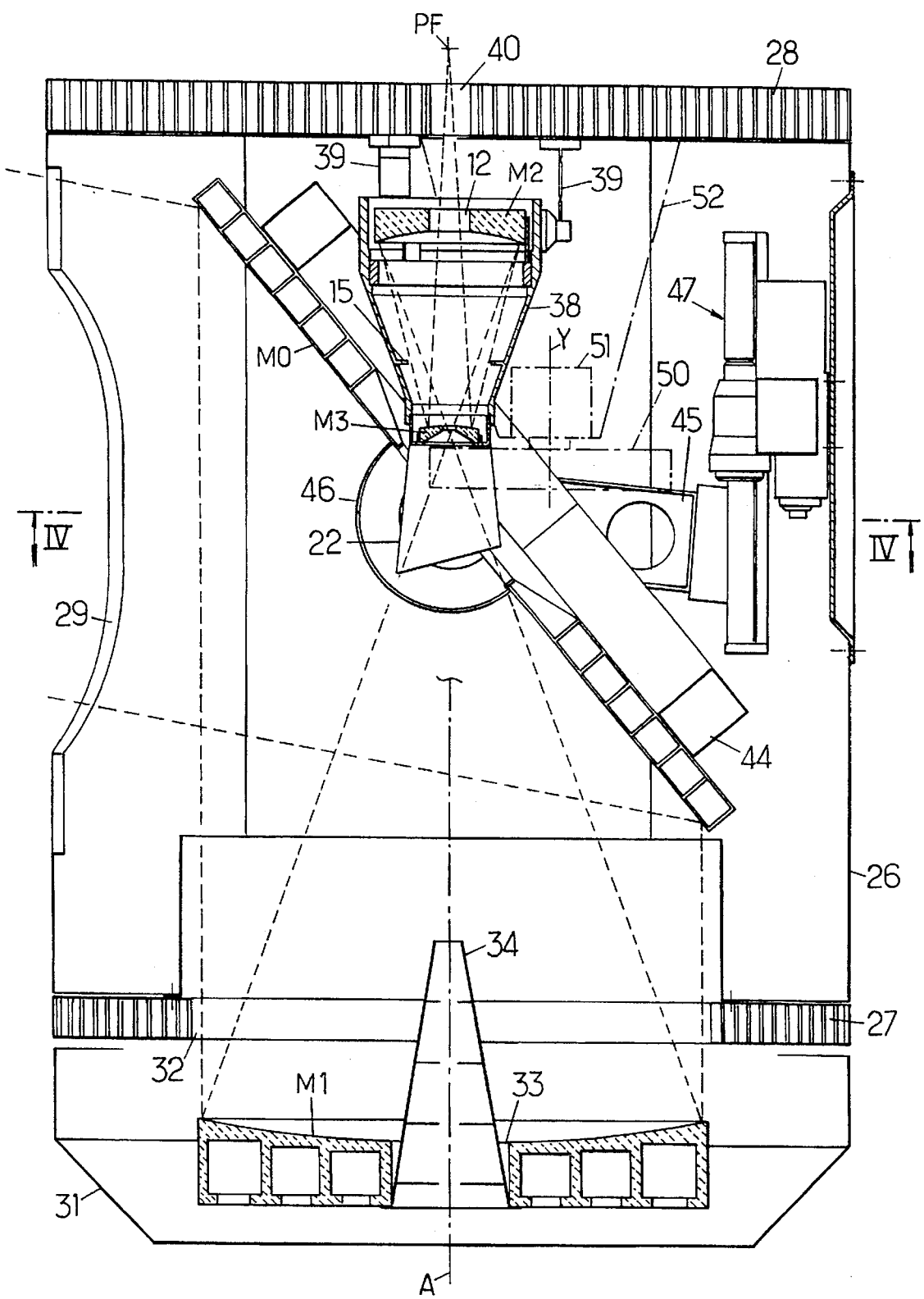
FIG. 3 is an overall view, in longitudinal cross section, of a telescope according to the invention.

The construction of an example of a telescope according to the invention is illustrated in a more detailed fashion in FIGS. 3 to 5. In this example, the optical elements are mounted in a main structure 26 in the form of a cylinder having an octagonal base, which cylinder is closed at its two ends by honeycomb-type walls 27, 28. The structure will in general be of light material, for example of carbon fibers, and covered by a thermal insulation material (not shown). An entrance window 29 is provided on one side of the cylinder 26. The scanning mirror M0 is situated to face this window 29. It reflects the incoming image towards the mirror M1 mounted on a support 31 to the rear of the wall 27, which includes a central aperture 32 to transmit the incoming image towards the mirror M1.

The mirror M1 likewise includes a central aperture 33. A screen 34 of frustoconical shape is disposed coaxially in front of the primary mirror M1, with its small base open towards the central aperture 13 of the tertiary mirror M3, to avoid a situation in which light arrives directly at the focal point PF of the telescope through the central apertures 13, 12 of the tertiary and secondary mirrors.

The relay optics is installed in a structure forming a screen, which includes, besides the screen 22 previously described with reference to FIG. 2, another screen 38 of frustoconical general shape which surrounds the space included between the mirrors M2 and M3 and supports the diaphragm 15. This structure is fixed to the wall 28 by means of an isostatic mount 39.

The focal point PF of the telescope is situated beyond the wall 28 which includes, at its center, a small aperture 40 to transmit the radiation emanating from the relay optics to the focal point PF.

The scanning mirror M0 is fixed by its rear face onto a support 44 which connects it to an orienting arm 45 (FIGS. 3 and 4). The arm 45 is generally C-shaped, and its two ends are mounted in a pivoting fashion in bearings 46, the fixed part of which is integral with the cylindrical structure 26. The bearings 46 define the axis of rotation X of the scanning mirror MO. This axis X, which is included in the plane of the mirror M0, is perpendicular to the central axis of the entrance window 29, and to the optical axis A of the mirrors M1, M2, M3. The entrainment in rotation of the mirror M0 is ensured by a jack mechanism 47 which causes the central part of the orienting arm 45 to slide, in one direction or in the other, parallel to the optical axis A. The mechanism 47 is fixed onto the cylindrical structure 26, onto the side opposite the entrance window 29. The bearings 46 may incorporate, in a conventional fashion, a blocking device intended to be brought into service in the course of the launch of the satellite.

FIGS. 3 and 4 likewise show (in dot-dashed lines in FIG. 3) the means permitting a calibration source to be brought to the location of the focal point of the primary mirror M1. Four sources 18 are shown at the periphery of a disk 50 disposed perpendicularly to the optical axis A, in an eccentric position. This disk 50 can pivot about its axis Y under the action of a motor 51. The motor 51 is fixed to the wall 28 via a support 52. The disk 50 is placed approximately at the location of the focal plane of the mirror M1, to the rear of the relay optics relative to the position of the entrance window 29, the optical axis A being at the location of the periphery of the disk 50. By commanding the motor 51, it is thus possible selectively to bring one of the sources 18 to the location of the focal point of the primary mirror. The periphery of the disk 50 likewise includes a notch 53 which, when it is situated in the position illustrated in FIG. 4, frees the optical axis A to transmit the image originating from the primary mirror, and thus to permit the normal operation of the telescope outside the calibration phases.

I claim:

1. A telescope comprising:
   at least one primary concave mirror disposed to receive an incoming image, and
   a relay optics to enlarge an image reflected by the primary mirror, wherein the relay optics includes a secondary mirror and a tertiary mirror each having a central aperture and each disposed coaxially with the primary mirror, wherein the secondary mirror receives the image reflected by the primary mirror through the central aperture of the tertiary mirror, and wherein the tertiary mirror, which is disposed in a vicinity of a focal plane of the primary mirror, receives an image reflected by the secondary mirror and reflects said image reflected by the secondary mirror through the central aperture of the secondary mirror, and wherein the relay optics further includes a diaphragm disposed coaxially between the secondary and tertiary mirrors, defining a pupil in an optical space between the primary and secondary mirrors.

2. A telescope according to claim 1, wherein the secondary mirror is concave, and the tertiary mirror is convex.

3. A telescope according to claim 1, wherein the tertiary mirror is situated beyond the focal plane of the primary mirror relative to the primary mirror.

4. A telescope according to claim 3, further comprising at least one calibration source, and a mechanism permitting said calibration source to be brought into a position substantially corresponding to the focal point of the primary mirror in order to carry out a calibration.

5. A telescope according to claim 4, comprising a plurality of calibration sources, said mechanism being adapted to bring any selected one of said sources to a position substantially corresponding to the focal point of the primary mirror.

6. A telescope according to claim 1, further comprising a scanning mirror whereby the incoming image is passed to the primary mirror by said scanning mirror which is plane and orientable, and which said scanning mirror is disposed in the vicinity of the focal plane of the primary mirror and provided with a central aperture.

7. A telescope according to claim 1, wherein the tertiary mirror is substantially spherical and wherein the primary and secondary mirrors are aspherical.

8. A telescope comprising:
   at least one primary concave mirror disposed to receive an incoming image,
   a relay optics to enlarge an image reflected by the primary mirror, wherein the relay optics includes a secondary mirror and a tertiary mirror each having a central aperture and each disposed coaxially with the primary mirror, wherein the secondary mirror receives the image reflected by the primary mirror through the central aperture of the tertiary mirror, wherein the tertiary mirror, which is disposed in a vicinity of a focal plane of the primary mirror, receives an image reflected by the secondary mirror through the central aperture of the secondary mirror, and wherein the tertiary mirror is situated beyond the focal plane of the primary mirror relative to the position of the primary mirror,
   at least one calibration source, and
   a mechanism permitting said calibration source to be brought into a position substantially corresponding to the focal point of the primary mirror in order to carry out a calibration.

9. A telescope according to claim 8, wherein the secondary mirror is concave, and the tertiary mirror is convex.

10. A telescope according to claim 8, comprising a plurality of calibration sources, said mechanism being adapted to bring any selected one of said sources to a position substantially corresponding to the focal point of the primary mirror.

11. A telescope according to claim 8, further comprising a scanning mirror whereby the incoming image is passed to the primary mirror by said scanning mirror which is plane and orientable, and which said scanning mirror is disposed in the vicinity of the focal plane of the primary mirror and provided with a central aperture.

12. A telescope according to claim 8, wherein the tertiary mirror is substantially spherical, and wherein the primary and secondary mirrors are aspherical.

13. A telescope comprising:

at least one primary concave mirror disposed to receive an incoming image, a relay optics to enlarge an image reflected by the primary mirror, wherein the relay optics includes a secondary mirror and a tertiary mirror each having a central aperture and each disposed coaxially with the primary mirror, wherein the secondary mirror receives the image reflected by the primary mirror through the central aperture of the tertiary mirror, and wherein the tertiary mirror, which is disposed in a vicinity of a focal plane of the primary mirror, receives the image reflected by the secondary mirror and reflects said image reflected by the secondary mirror through the central aperture of the secondary mirror, and a scanning mirror whereby the incoming image is passed to the primary mirror by said scanning mirror which is plane and orientable, and which said scanning mirror is disposed in the vicinity of the focal plane of the primary mirror and provided with a central aperture.

14. A telescope according to claim 13, wherein the second mirror is concave, and the tertiary mirror is convex.

15. A telescope according to claim 13, wherein the tertiary mirror is situated beyond the focal plane of the primary mirror relative to the primary mirror.

16. A telescope according to claim 13, wherein the tertiary mirror is substantially spherical, and wherein the primary and secondary mirrors are aspherical.

* * * * *